United States Patent
Tolstov et al.

(10) Patent No.: US 10,783,008 B2
(45) Date of Patent: Sep. 22, 2020

(54) SELECTIVE ACCELERATION OF EMULATION

(71) Applicant: Sony Interactive Entertainment Inc., Tokyo (JP)

(72) Inventors: Dmitri Tolstov, San Carlos, CA (US); Jacob P. Stine, La Honda, CA (US); Geoffrey Piers Robert Norton, Foster City, CA (US); Takayuki Kazama, Castro Valley, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 677 days.

(21) Appl. No.: 15/607,302

(22) Filed: May 26, 2017

(65) Prior Publication Data

US 2018/0341531 A1 Nov. 29, 2018

(51) Int. Cl.
| | |
|---|---|
| *G06F 9/52* | (2006.01) |
| *G06F 9/455* | (2018.01) |
| *H04N 21/443* | (2011.01) |
| *H04N 21/44* | (2011.01) |
| *H04N 21/442* | (2011.01) |
| *H04N 21/43* | (2011.01) |
| *G06F 1/12* | (2006.01) |
| *H04N 5/04* | (2006.01) |

(52) U.S. Cl.
CPC ............ *G06F 9/52* (2013.01); *G06F 9/455* (2013.01); *H04N 21/4302* (2013.01); *H04N 21/44008* (2013.01); *H04N 21/4424* (2013.01); *H04N 21/4437* (2013.01); *G06F 1/12* (2013.01); *H04N 5/04* (2013.01)

(58) Field of Classification Search
CPC .. G06F 9/52; G06F 9/455; G06F 1/12; H04N 21/4437; H04N 21/44008; H04N 21/4424; H04N 21/4302; H04N 5/04
See application file for complete search history.

(56) References Cited

U.S. PATENT DOCUMENTS

| | | |
|---|---|---|
| 7,685,593 B2 | 3/2010 | Solomon et al. |
| 9,248,374 B2 | 2/2016 | Watson et al. |
| 9,536,461 B2 | 1/2017 | Stine et al. |
| 9,623,327 B2 | 4/2017 | Miura et al. |
| 9,694,276 B2 | 7/2017 | Stine et al. |
| 9,707,476 B2 | 7/2017 | Watson et al. |
| 9,717,989 B2 | 8/2017 | Miura et al. |
| 2002/0109680 A1 | 8/2002 | Orbanes et al. |
| 2005/0081218 A1 | 4/2005 | Acott et al. |

(Continued)

OTHER PUBLICATIONS

International Search Report & Written Opinion dated Jul. 5, 2018 for International Patent Application No. PCT/US2018/029207.

*Primary Examiner* — Eunhee Kim
(74) *Attorney, Agent, or Firm* — JDI Patent; Joshua D. Isenberg; Robert Pulllman (57) ABSTRACT

Selective acceleration of emulation of programs written for a legacy computer system on a more modern computer system is disclosed. The host system processes emulated program assets that are synchronized with host outputs. When a reduced need for synchronization between the emulated program assets and a host output is detected, synchronization of processing of emulated program assets and the host output is unlocked and the host system accelerates processing of the emulated program assets for which the synchronization has been unlocked.

20 Claims, 4 Drawing Sheets (56) References Cited

U.S. PATENT DOCUMENTS

| | | |
|---|---|---|
| 2006/0281556 A1 | 12/2006 | Solomon et al. |
| 2014/0004956 A1 | 1/2014 | Miura et al. |
| 2014/0004957 A1* | 1/2014 | Stine ................. A63F 13/88 463/42 |
| 2014/0004962 A1* | 1/2014 | Miura ................. A63F 13/06 463/47 |
| 2014/0092087 A1 | 4/2014 | Kazama et al. |
| 2014/0094299 A1 | 4/2014 | Stine et al. |
| 2014/0094313 A1 | 4/2014 | Watson et al. |
| 2014/0094314 A1 | 4/2014 | Watson et al. |
| 2014/0094315 A1 | 4/2014 | Stine et al. |
| 2014/0274380 A1 | 9/2014 | Kazama |
| 2016/0005344 A1 | 1/2016 | Stine et al. |

* cited by examiner

SELECTIVE ACCELERATION OF EMULATION

FIELD OF THE INVENTION

The current disclosure relates to emulation of legacy programs. More specifically the current disclosure relates to accelerated processing during emulation of programs.

BACKGROUND OF THE INVENTION

In emulation of programs written for a target system (e.g., a legacy device) on a host system, (e.g., a different system or a more modern version of the target system) often times the target system is less powerful than the host system. The reduced power of the target system may take the form of a slower clock speeds or system component response times. Programs written for the target system may be dependent on the slower speeds of the target system. Due to this dependency emulated programs may not be able to take advantage of the full capabilities of the host system.

In a cloud-based gaming system the majority of the processing takes place on the cloud-based server. This allows the client device platform that is communicating with the cloud-based server to use less resources for processing the cloud based game. Current techniques implement incremental buffering to make the game load faster and parallel processing between the server and the client. However as a result of this arrangement communication between the client device and the server must be synchronized. If the client device and the server are not synchronized it may result in unusual or unexpected device behavior.

With cloud based emulation of legacy games the client or host device is often significantly more powerful than the target system that the legacy game was programmed to run on. As a result improvements to the running of an emulated game could be achieved if the client device could accelerate the processing for emulation of games. Thus, there is a need in the art, for a way to accelerate processing of emulated games.

BRIEF DESCRIPTION OF THE DRAWINGS

Aspects of the present disclosure can be readily understood by considering the following detailed description in conjunction with the accompanying drawings, in which.

INTRODUCTION

Ordinarily when emulating a program written for a target system that is constrained by the power of the target system the output of the host system must be synchronized with the processing speed of the program assets on the target system. However during emulation of program assets for a target system on a host system there may be times when the host system does not need to be constrained by the processing speed of the target system. Within this window the host system may accelerate processing of program assets. Similarly emulation over a network may be constrained by the need for the client device and the server to be synchronized in order for the game to run correctly. This need for synchronization prohibits more powerful client device from having improved performance when running emulated legacy games over the network. Thus according to aspects of the present disclosure performance of emulation of games over a network may be realized by accelerating processing of the emulated game at specific times within the application where synchronization does not affect the performance of the game.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

According to aspects of the present disclosure a host system may implement a scheme for accelerating emulation of programs written for a target system on a host system 100. The host system may carry out the emulation process by generating emulated program assets that can be processed by the host system to generate and utilize resulting outputs (referred to herein as host outputs). Alternatively, the host system generate the program assets or host outputs and transmit them to a remote system over the network for processing and/or utilization. In the case of a host system implementing emulation, the target system code may be translated by the host system and the translated code may then be executed. During execution the host system may reduce the speed at which it processes instructions 101 in order to maintain synchronization between the outputs of the host system. For example the audio and video of a program may be synchronized on a target but when that program is emulated at the full speed of the host system there will be a loss in synchronization because the audio processes faster than the video on the host system and the original program was not designed to account for this difference. Similarly there may be processor speed dependent elements of video or audio in a program for a target system that when run on a host system at the full speed of the host system cause the program to behave in ways that are unexpected by the user. These problems all decrease the quality of emulation on a host system unless the system reduces the speed at which it processes the emulation. Thus to avoid loss of quality of emulation the host system synchronizes the processing of emulated assets and generation of host outputs with the speed of the emulated target system. As a result of this compromise the host system may not provide any apparent improvement in running target system programs to an end user despite being a newer and more powerful device.

Figure 1:
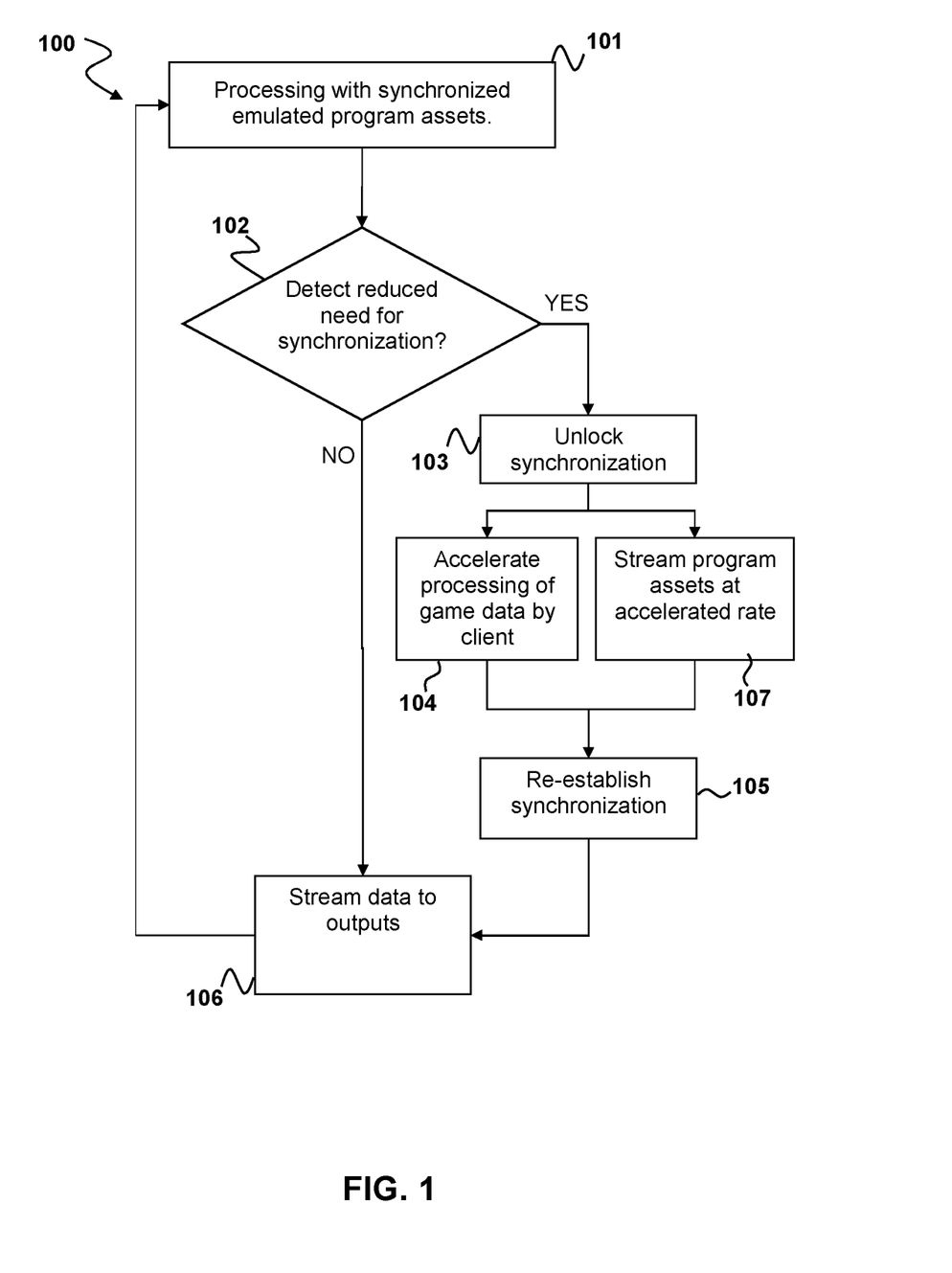
FIG. 1 is a flow diagram of a method for selective acceleration of emulation according to an aspect of the present disclosure.

To realize improved performance of target system programs on the host the host system implements a method for selective acceleration of processing as shown in FIG. 1. The host system may detect when there is a decreased need of synchronization of processing of emulated program assets with the emulation of the target system, as indicated at 102.

There are a number of situations during emulation that may be characterized by a reduced need for emulation. A common feature of many such situations is that the user experience is not affected, or is even enhanced, by a reduced level or complete lack of synchronization between processing of emulated program assets and generation of host outputs. Some non-limiting examples of such situations include situations where audio, video, or haptic outputs need not be synchronized to other aspects of the emulation or with each other.

By way of example, and not by way of limitation, in certain implementations, detecting reduced need for synchronization of processing emulated program assets and the host output at 102 may include detecting a pre-loaded mini-game with preloaded audio and video components. Such detection may be used to trigger acceleration of loading of mini-games. For example a loading screen mini-game (i.e., a mini-game that can be played as another application loads) can be identified by monitoring emulated program memory subsystems for uniquely identifiable behaviors indicative of non-visible asset preparation. An example of a behavior which may be unique to a loading screen mini-game is loading large assets into video memory and without immediate usage by the video subsystem. A repeating pattern of such unused allocations is a strong indication that background loading is occurring and that the behavior observed by the user is a mini-game or animated loading screen. Heuristic criteria for determining asset allocation size, repeating patterns, and immediate usage may vary according to the emulated target architecture.

If reduced need for synchronization is detected the host system may unlock synchronization with the emulation of the target system as indicated at 103, and accelerate processing of emulated program assets as indicated at 104.

Figure 2:
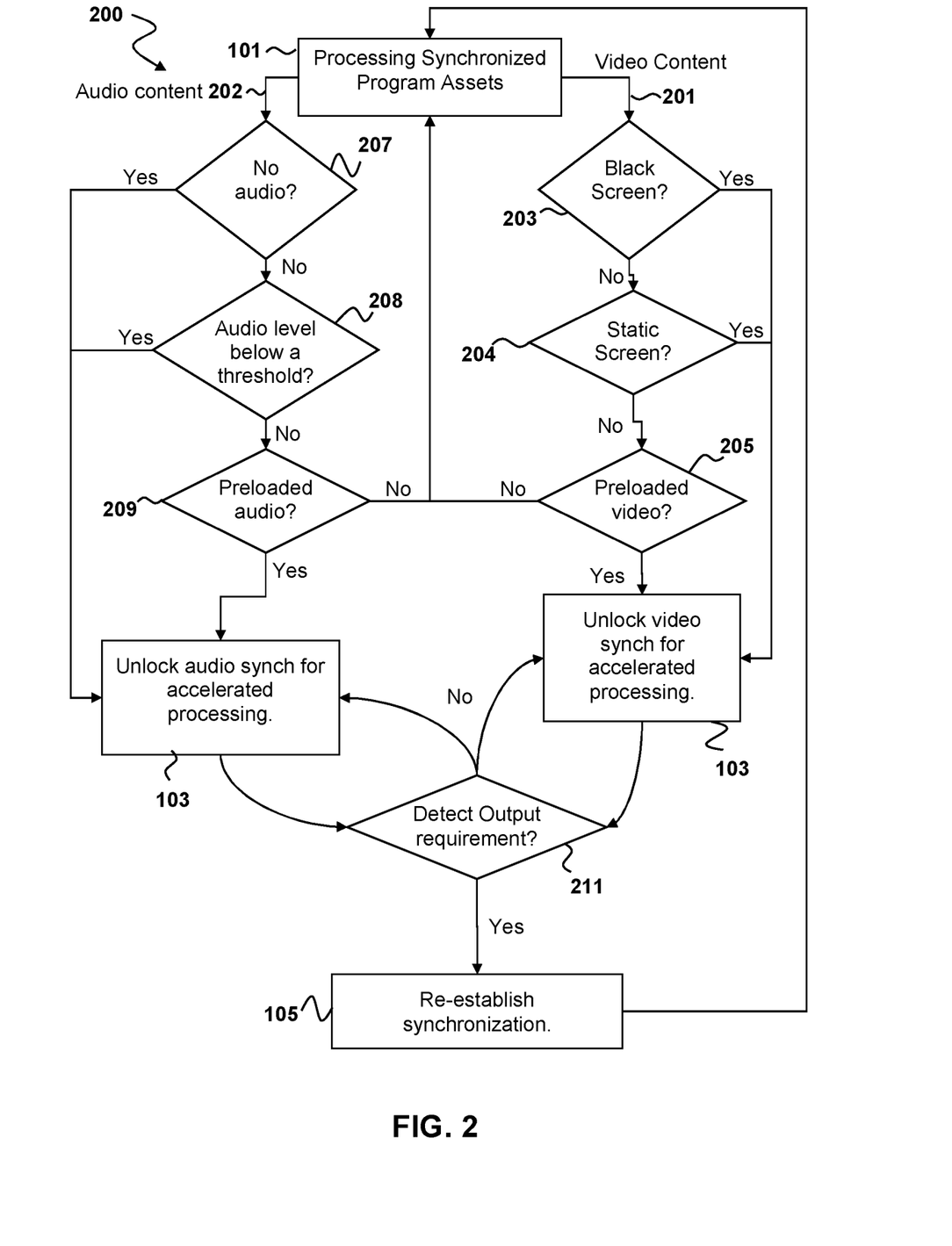
FIG. 2 is a flow diagram depicting method of detection of reduced need for synchronization and detecting a need for resynchronization according to aspects of the present disclosure.

To detect whether the host system may unlock synchronization the host may implement an output detection process 200 as shown in FIG. 2. In the illustrated example, the output detection process may be split between detection of audio 202 and video 201.

For detection of video 201, the system may initially detect whether the display output is black or blank 203. Alternatively the host system detects whether the emulated program requires the host system to output an image to the screen 203. If an image output is detected the system may monitor the output to detect whether the required output is static 204. For instance the host system may monitor the video output for changes over a specified period of time, if no changes are found then the host system determines the screen is static 204.

Alternatively the host system may monitor whether the emulated program requires the output of a static screen 204. If a static screen is not detected the host system may monitor the emulated program assets to determine whether the video output has already been loaded into memory 205. If the host system detects that the video output has been preloaded into memory the host system may further determine whether any additional processing of the video is required. In other embodiments if the host system detects repeated bulky memory allocations to the system or GPU memory that are not immediately used then the host system may accelerate processing of video. A preloaded video may be detected as a single or repeated memory allocation that is immediately used. It should be understood that a bulky memory allocation may be defined by the system automatically or by a user depending upon the application. The threshold for immediate use may vary depending on application, system architecture, etc.

If during the above steps the host system determines that there is a no display output 203 or a static output 204 or a preloaded video sequence 205 then the system will unlock the synchronization of processing video assets 103. The synchronization of video assets may be between audio and video. Alternatively the synchronization may be between the processing clock speed of the emulated target system and processing of the video assets. For example the emulated program may include processor clock speed dependent assets that when processed at a different clock speed than the target system will create user-perceived unwanted behavior. By way of example and not by way of limitation user perceived unwanted behavior may be in a video game the characters move across the screen much faster than expected. In another embodiment the synchronization may be between the processing of video assets on the host system and an emulator running over the network on a remote system. In other words the host system may be receiving emulated program assets from a server operating over the network. As soon as the server sends a video asset to the host system may perform processes on the video asset and output the result to an display device. According to aspects of the current disclosure the host system unlocks synchronization of processing of video assets 103 during times when a user of the system would not detect a change in program behavior due to the accelerated processing of video data. By way of example and not by way of limitation, the host system may unlock synchronization 103 and accelerate processing video assets 104 by processing emulated video assets at clock speed that is higher than that of the emulated target system. In another embodiment the host system may unlock synchronization 103 and accelerate processing 104 by processing emulated video assets at a higher rate than the playback rate of emulated audio assets. Similarly the host system may unlock synchronization 103 and accelerate the processing of emulated video assets 104 by processing the emulated video assets at a faster rate on the host system than a remote emulator transmitting emulated assets over the network.

If the host system does not detect a preloaded video sequence or more processing is required on the preloaded video sequence, the processing of emulated video assets will remain synchronized with emulation of the target system 206. Though video assets were discussed the term is not limited to video and as used herein may refer to images displayed on a screen as well as data for rendering images or physics data for simulations or the like.

For detection of audio 202, the host system may initially detect whether there is any sound output to the speakers 207. Alternatively the host system may monitor the emulated audio assets to determine whether audio output is required. If audio output is required the host system may determine whether the audio output is below a threshold 208. If the audio output is not below a threshold the host system may monitor the emulated audio assets to determine whether the audio is already loaded in to memory 209. If the host system determines that the audio is preloaded the host system may further detect whether any processing needs to be done on the audio. In other embodiments if the host system detects repeated bulky memory allocations to the system or GPU memory that are not immediately used then the host system may accelerate processing of audio. Preloaded audio may be detected as a single or repeated memory allocation that is immediately used. It should be understood that a bulky memory allocation may be defined by the system automatically or by a user depending upon the application. The threshold for immediate use may vary depending on application, system architecture, etc.

If during the above steps it is determined that there is no audio 207 or the audio is below a threshold 208 or the audio is preloaded into memory 209 then the host system will unlock processing of the audio assets 103. As discussed above with respect to video, audio processing may be locked to the rate of the video. Similar to video, audio assets may be dependent on the clocks speed of the emulated target system and when processed at a different clock speed than the target system may result in user-perceived unwanted behavior. By way of example and not by way of limitation user-perceived unwanted audio behavior might be music playing at a higher pitch due to the accelerated processing. In another embodiment the synchronization may be between the processing of audio assets on the host system and an emulator running over the network on a remote system. In other words the host system may be receiving emulated audio assets from a server operating over the network. As soon as the server sends an audio asset to the host system, the host may perform processes on the audio asset and output the result to an output device (for instance speakers). According to aspects of the current disclosure the host system unlocks synchronization of processing of audio assets during times when a user of the system would not detect a change in program behavior due to the accelerated processing of audio data. By way of example and not by way of limitation, the host system may unlock synchronization 103 and accelerate processing audio assets 104 by processing emulated audio assets at a clock speed that is higher than that of the emulated target system. The host system may unlock synchronization 103 and accelerate processing of emulated audio assets 104 at a rate that is faster than the processing of emulated video assets. Similarly the host system may unlock synchronization 103 and accelerate processing of emulated audio assets 104 by processing audio assets at a faster rate on the host system than a remote emulator emulates the target system and transmits emulated assets over the network.

If the host system does not detect a preloaded audio or more processing is required on the preloaded audio 206, the processing of emulated audio assets will remain synchronized with emulation of the target system 101. Though audio assets were discussed the term is not limited sound files and as used herein may refer to music, contextual sounds, sounds from interactions within a simulated environment and the like.

According to aspects of the current disclosure while the host system is accelerating processing 104, the system may monitor output 210 to determine whether to resynchronize processing 105. The system may monitor the processing of the emulated program assets to determine whether the emulated program requires the system to output information to an external device 211. In some embodiments monitoring the processing of emulated program assets may include monitoring memory allocations to detect a change from allocation of bulky blocks of memory to use of those memory blocks to detect a change from outputting preloaded audio or video. By way of example and not by way of limitation the system may monitor the program for a change in display data to be sent to a screen or for changes in sound data to be sent to the speakers or for changes in other data such as color data to be sent to controllers or communication data to be sent over the network. If no change is detected the system will continue accelerated processing of the emulated program assets 103. If a change in output is required then the system will return to processing at the previous rate and resynchronize with the emulated target system 105. Once the system has resynchronized with targets 105 it may return to processing the synchronized program assets 101.

According to aspects of the present disclosure the unlocking of synchronization 103 is not limited to implementations of video and audio. The disclosed method of detecting output 200 and accelerating processing 100 may be applied to other types of output for instance color information for lights connected to the host system or robotic manipulator control information and the like. One possible example of implementation to robotic manipulator control information would be if the target system instructions were for an older style robotic device and the host device offers certain advantages, or has removed some particular mechanical process entirely. In such circumstances the emulation could be accelerated using the approach describe herein. In some situations, such target code instructions may be removed outright. In addition the techniques described herein may be applied to situations where the target instructions have other meaningful side effects, such that the instructions cannot be skipped, but need not be restricted to an established rate of execution that might have been established by the older style robotics.

Figure 3:
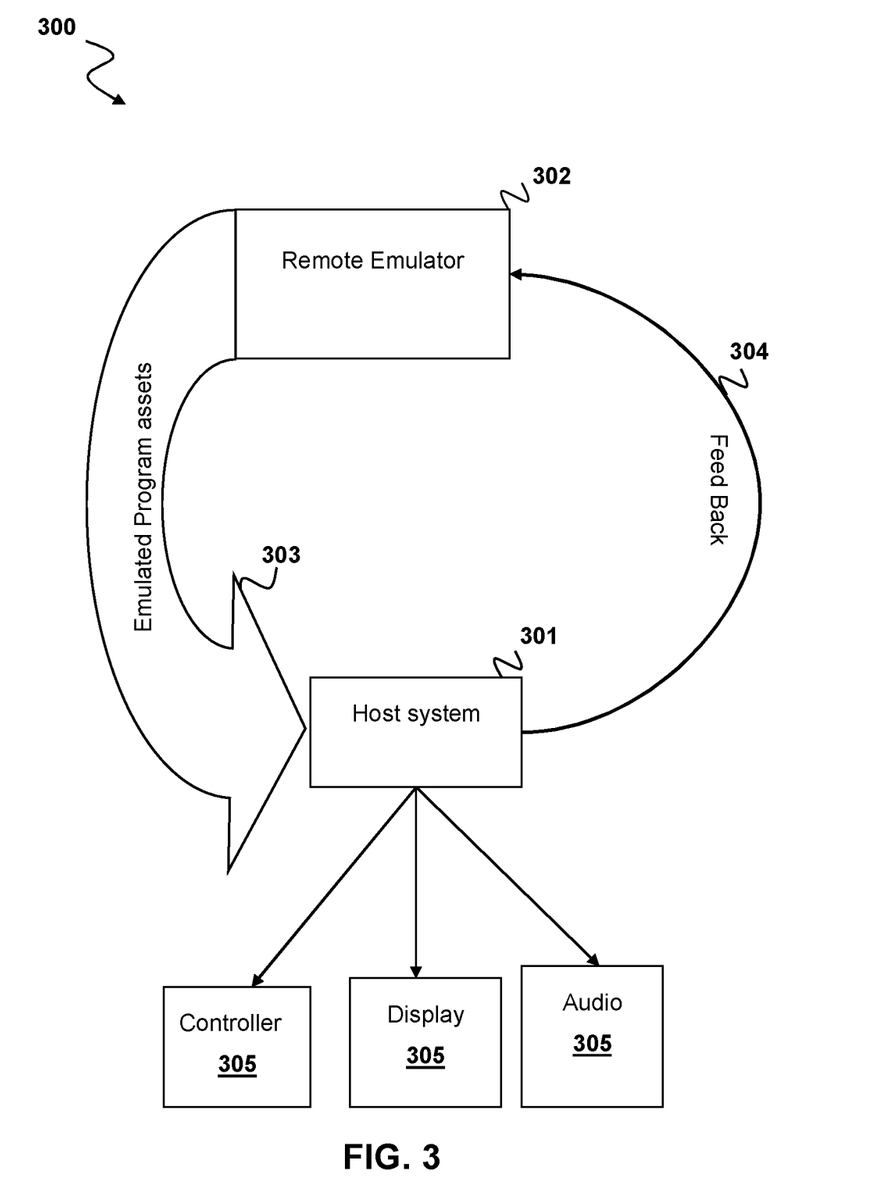
FIG. 3 is a flow diagram showing selective acceleration of emulation over a network according to aspects of the present disclosure.

FIG. 3 depicts other aspects of the current disclosure; the host system 301 may implement the method to accelerate emulation 100 in conjunction with an emulator operating over a network 302. In the case of a remote emulator 302 the host system may receive emulated program assets 303 from the remote emulator 302, process the emulated program assets immediately and output the result 106 to external devices 305. Thus in the described configuration the processing of emulated program assets on the host system 301 may be synchronized with the emulation of the target system on the remote emulator 302. To realize improvements in the operation of emulated programs on the host system, the host system 301 may implement the method of acceleration of emulation 100, including accelerated streaming of program assets 107. The host system 301 may provide feed-back 304 to the remote emulator 302 that includes information about the processing of emulated program assets 101, or 104. Thus the emulator may remain informed about the processing of emulated program assets on the host system and utilize this information when the host system resynchronizes 104 with the emulation of the target system on the emulator 302.

In other embodiments when the host system 301 detects 200 that it may unlock synchronization of processing of emulated program assets 103, the host system may inform the remote emulator through the feedback 304. In response the remote emulator may accelerate the rate at which the emulated program assets are sent 307 to the host system 107. The emulated program assets that are sent 307 to the host system 301 at an accelerated rate may fill a buffer of the host system for further processing. Alternatively the program assets sent 307 at an accelerated rate 107 may be processed immediately in accordance with the accelerated processing 104 taking place on the host system 301. During this process the host system may continue to send feedback 304 to the remote emulator 302 to ensure that too many emulated program assets are not sent to the host system resulting in a buffer overflow condition. Likewise the host system 301 may send feedback 304 to the remote emulator 302 indicating that additional emulated program assets are needed immediately to prevent buffer underflow or stalling. Additionally the feedback reports 304 may inform the remote emulator to suspend cheat detection or other rate dependent processes during accelerated processing of emulated program assets.

Once the host system 301 determines that an output is required by the emulated program it may send a feedback 304 to the remote emulator 302 to resynchronize 105 the emulation of the target system on the emulator with the processing of emulated assets on the host system 301.

Figure 4:
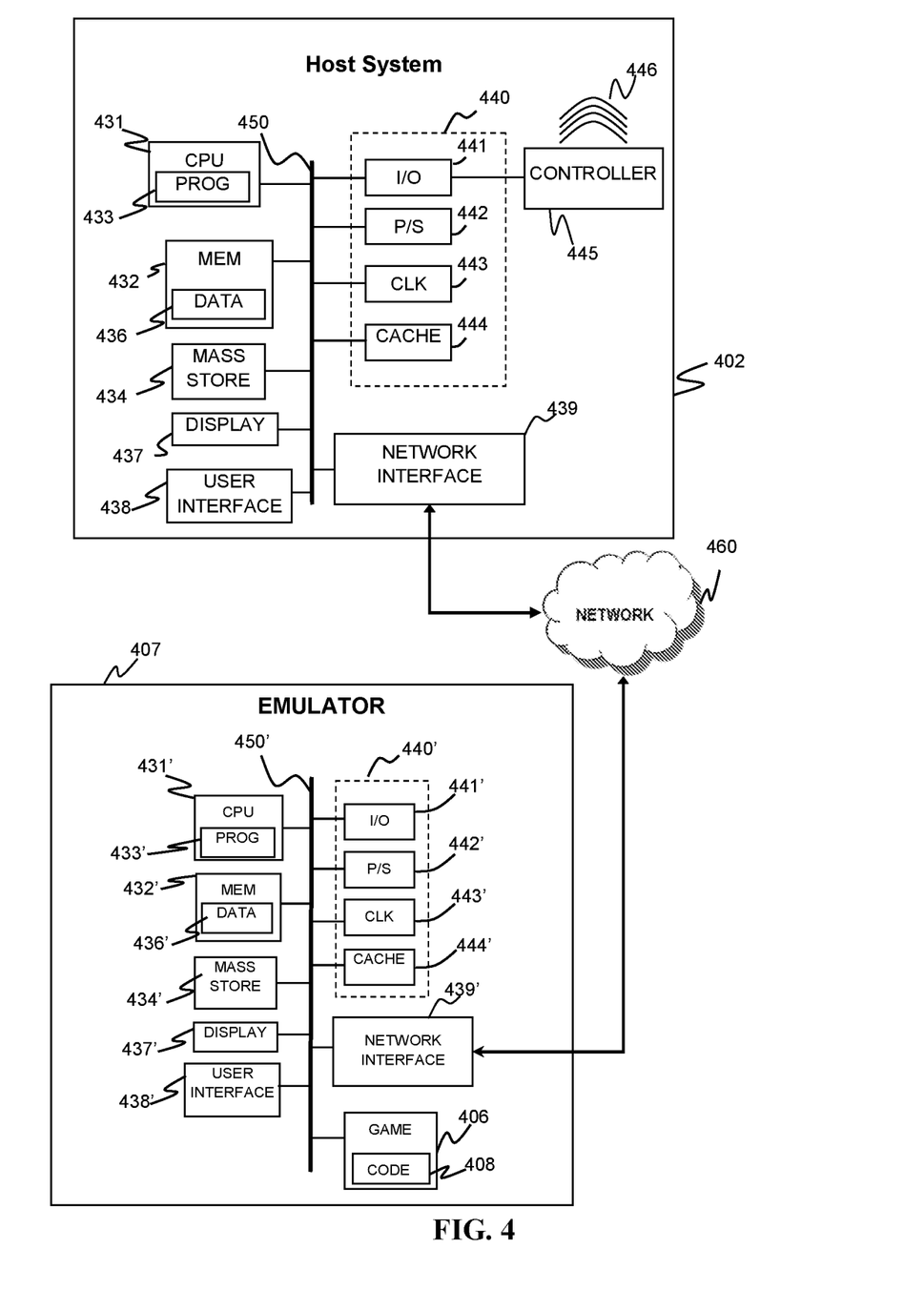
FIG. 4 is a block diagram of a system that implements selective acceleration of emulation according aspects of the present disclosure.

The block diagram shown in FIG. 4 schematically illustrates certain aspects of the present disclosure within the particular context of remote emulation. In this example, an emulator 407 may be accessed by a host system 402 over a network 460. The host system 402 may access alternative remote emulators 407 over the network 460 (herein referred to as remote emulators). Emulators 407 may be identical to each other, or they may each be programmed to emulate unique legacy programs 406 including unique legacy games 406. Additionally, the emulator 407 may be contained within the host system 402 and may communicate directly with the host system over an internal system bus 450'

Alternatively the emulation of the target system may take place wholly on the host system 402. In this case the legacy program may be loaded in to the memory 436 of the host system 402 and the CPU 431 carries the out emulation program 433.

Host system 402 may include a central processor unit (CPU) 431. By way of example, a CPU 431 may include one or more processors, which may be configured according to, e.g., a dual-core, quad-core, multi-core, or Cell processor architecture. Host system 402 may also include a memory 432 (e.g., RAM, DRAM, ROM, and the like). The CPU 431 may execute a process-control program 433, portions of which may be stored in the memory 432. The host system 402 may also include well-known support circuits 440, such as input/output (I/O) circuits 441, power supplies (P/S) 442, a clock (CLK) 443 and cache 444. The host system 402 may optionally include a mass storage device 434 such as a disk drive, CD-ROM drive, tape drive, or the like to store programs and/or data. The host system 402 may also optionally include a display unit 437 and a user interface unit 438 to facilitate interaction between the Host System 402 and a user who requires direct access to the host system 402. The display unit 437 may be in the form of a cathode ray tube (CRT) or flat panel screen that displays text, numerals, or graphical symbols. The user interface unit 438 may include a keyboard, mouse, joystick, light pen, or other device. A controller 445 may be connected to the Host System 402 through the I/O circuit 441 or it may be directly integrated into the Host System 402. The controller 445 may facilitate interaction between the Host System 402 and a user. The controller 445 may include a keyboard, mouse, joystick, light pen, hand-held controls or other device. The controller 445 is also may be capable of generating a haptic response 446. By way of example and not by way of limitation, the haptic response 446 may be vibrations or any other feedback corresponding to the sense of touch. The Host System 402 may include a network interface 439, configured to enable the use of Wi-Fi, an Ethernet port, or other communication methods.

The network interface 439 may incorporate suitable hardware, software, firmware or some combination of two or more of these to facilitate communication via an electronic communications network 460. The network interface 439 may be configured to implement wired or wireless communication over local area networks and wide area networks such as the Internet. The Host System 402 may send and receive data and/or requests for files via one or more data packets over the network 460.

The preceding components may exchange signals with each other via an internal system bus 450. The Host System 402 may be a general purpose computer that becomes a special purpose computer when running code that implements embodiments of the present invention as described herein.

The emulator 407 may include a central processor unit (CPU) 431'. By way of example, a CPU 431' may include one or more processors, which may be configured according to, e.g., a dual-core, quad-core, multi-core, or Cell processor architecture. The emulator 407 may also include a memory 432' (e.g., RAM, DRAM, ROM, and the like). The CPU 431' may execute a process-control program 433', portions of which may be stored in the memory 432'. The emulator 407 may also include well-known support circuits 440', such as input/output (I/O) circuits 441', power supplies (P/S) 442', a clock (CLK) 443' and cache 444'. The emulator 407 may optionally include a mass storage device 434' such as a disk drive, CD-ROM drive, tape drive, or the like to store programs and/or data. The emulator 407 may also optionally include a display device 437' and user interface unit 438' to facilitate interaction between the emulator 407 and a user who requires direct access to the emulator 407. By way of example and not by way of limitation a host system or engineer 402 may need direct access to the emulator 407 in order to program the emulator 407 to properly emulate a desired legacy program 406 or to add additional capabilities to a legacy program 406. The display device 437' may be in the form of a cathode ray tube (CRT) or flat panel screen that displays text, numerals, or graphical symbols. The user interface unit 438' may include a keyboard, mouse, joystick, light pen, or other device. The emulator 407 may include a network interface 439', configured to enable the use of Wi-Fi, an Ethernet port, or other communication methods.

The network interface 439' may incorporate suitable hardware, software, firmware or some combination of two or more of these to facilitate communication via the electronic communications network 460. The network interface 439' may be configured to implement wired or wireless communication over local area networks and wide area networks such as the Internet. The emulator 407 may send and receive data and/or requests for files via one or more data packets over the network 460.

The preceding components may exchange signals with each other via an internal system bus 450'. The emulator 407 may be a general purpose computer that becomes a special purpose computer when running code that implements embodiments of the present invention as described herein.

Emulator 407 may access a legacy program 406 that has been selected by the Host System 402 for emulation through the internal system bus 450'. There may be more than one legacy program 406 stored in the emulator. The legacy programs may also be stored in the memory 432' or in the mass storage device 434'. Additionally, one or more legacy programs 406 may be stored at a remote location accessible to the emulator 407 over the network 460. Each legacy game 406 contains game code 408. When the legacy game 106 is emulated, the game code 408 produces legacy game data 409.

By way of example, a legacy program 406 may be any program that is not compatible with a target platform. By way of example and not by way of limitation, the legacy program 406 may have been designed to be played on Sony Computer Entertainment's PlayStation console, but the target platform is a home computer. By way of example, the legacy game 406 may have been designed to be played on a PlayStation 2 console, but the target platform is a PlayStation 3 console. Further, by way of example and not by way of limitation, a legacy game 406 may have been designed to be played on a PlayStation console, but the target platform is a hand held console such as the PlayStation Vita from Sony Computer Entertainment.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. In synchronized emulation of programs for a target system on a host system in which the target system is slower than the host system and one or more emulated program assets for the target system is synchronized with one or more host outputs of the host system, a method for selective acceleration of processing of emulated program assets on the host system, the method comprising:
   a) processing the synchronized emulated program assets on the host system;
   b) detecting reduced need for synchronization between the emulated program assets and a host output;
   c) unlocking synchronization of processing of the one or more emulated program assets and the one or more host outputs;
   d) accelerating processing on the host system of the one or more emulated program assets for which synchronization has been unlocked.

2. The method of claim 1 further comprising:
   e) detecting an imminent need for synchronized host output;
   f) resynchronizing processing of emulated program assets and the host outputs.

3. The method of claim 2 wherein: the accelerated processing of emulated program assets in d) further comprises receiving emulated program assets over the network at an accelerated rate.

4. The method of claim 3 wherein receiving emulated program assets over the network further comprises sending a signal over the network to unlock synchronization and wherein f) further comprises sending feedback over the network to resume synchronized emulation.

5. The method of claim 1 wherein detecting reduced need for synchronization of processing emulated program assets and the host output in b) includes detecting decreased video output.

6. The method of claim 5 wherein the decreased video output is a blank or black screen.

7. The method of claim 5 wherein the decreased video output is a static image.

8. The method of claim 5 wherein the decreased video output is a preloaded video sequence or loop.

9. The method of claim 5 wherein unlocking synchronization in c) is only performed on video components and accelerating processing in d) is only performed on video components.

10. The method of claim 1 wherein detecting reduced need for synchronization of processing emulated program assets and host output in b) includes detecting decreased audio output.

11. The method of claim 10 wherein decreased audio output is no audio signal.

12. The method of claim 10 wherein decreased audio output is an audio signal below a threshold.

13. The method of claim 10 wherein decreased audio output is a preloaded audio sequence or loop.

14. The method of claim 10 wherein unlocking synchronization in c) is only performed on audio components and accelerate processing in d) is only performed on audio components.

15. The method of claim 1 wherein detecting reduced need for synchronization of processing emulated program assets and the host output in b) comprises detecting a pre-loaded mini-game with preloaded audio and video components.

16. The method of claim 2 wherein detecting an imminent need for host output in e) comprises detecting a communication output to a controller.

17. The method of claim 2 wherein detecting an imminent need for host output in e) comprises detecting a communication output with a server on the network.

18. The method of claim 2 wherein detecting an imminent need for host output in e) comprises detecting a communication output with a display device.

19. The method of claim 2 wherein detecting an imminent need for host output in e) comprises detecting a communication output an audio output device.

20. A non-transitory computer-readable medium containing executable instructions that when executed cause a computer system to implement a method for selective acceleration of processing of emulated one or more program assets that are synchronized to one or more host outputs of the host system, the method comprising:
   a) processing the synchronized emulated program assets on the host system;
   b) detecting reduced need for synchronization of processing of the one or more emulated program assets with a host output;
   c) unlocking synchronization of the one or more emulated program assets and the one or more host outputs;
   d) accelerating processing on the host system of the one or more program assets for which synchronization has been unlocked.

* * * * *